United States Patent
Sandow

(10) Patent No.: US 11,238,254 B2
(45) Date of Patent: Feb. 1, 2022

(54) APPARATUS AND METHODS FOR ELECTRONIC CONTENT PRESENTATION BASED ON BARCODE SCANS

(71) Applicant: LAUNCH CODE, LLC, New York, NY (US)

(72) Inventor: Adam I. Sandow, Boca Raton, FL (US)

(73) Assignee: LAUNCH CODE, LLC, New York, NY (US)

( * ) Notice: Subject to any disclaimer, the term of this patent is extended or adjusted under 35 U.S.C. 154(b) by 0 days.

(21) Appl. No.: 16/675,405

(22) Filed: Nov. 6, 2019

(65) Prior Publication Data

US 2021/0133411 A1     May 6, 2021

(51) Int. Cl.
*G06K 7/14*     (2006.01)
*G06K 19/06*     (2006.01)

(52) U.S. Cl.
CPC ..... *G06K 7/1417* (2013.01); *G06K 19/06037* (2013.01)

(58) Field of Classification Search
None
See application file for complete search history.

(56) References Cited

U.S. PATENT DOCUMENTS

| | | | |
|---|---|---|---|
| 9,646,101 B1* | 5/2017 | Wu | G06K 19/06028 |
| 2011/0137742 A1 | 6/2011 | Parikh | |
| 2011/0226850 A1 | 9/2011 | Ungos et al. | |
| 2013/0035787 A1 | 2/2013 | Canter | |
| 2013/0092730 A1 | 4/2013 | Blinbaum | |
| 2014/0110468 A1* | 4/2014 | Kandregula | G06K 7/1447 235/375 |
| 2015/0178721 A1 | 6/2015 | Pandiarajan et al. | |
| 2018/0109678 A1* | 4/2018 | Sharma | H04L 67/22 |

FOREIGN PATENT DOCUMENTS

| | | |
|---|---|---|
| EP | 2701099 | 2/2014 |
| WO | 2015105688 | 7/2015 |

OTHER PUBLICATIONS

Enterprise Essentials, "Using QR codes for ecommerce", BigCommerce Pty. Ltd. Shopping Cart Software, 2003, 4 pages.

* cited by examiner

*Primary Examiner* — Kristy A Haupt
(74) *Attorney, Agent, or Firm* — Duane Morris LLP; Gregory M. Lefkowitz; Joaquin Hernandez

(57) ABSTRACT

A code scanning system is disclosed. The system may include a computing device, a web server, and a scanning device. The scanning device may scan a code, such as a quick response (QR) code, and in response, the scanning device executes a scanning action, such as directing a web browser to a website hosted by the web server. The website may include various user actions. The computing device provides a software platform that allows for the configuration of scanning actions and user actions. For example, each code may be associated with a client of the software platform, where the software platform allows the client to select and/or configure scanning actions that are executed by the scanning device when a code is scanned, such as being directed to the website. The software platform may also allow for the configuration of user actions that are provided on the website.

20 Claims, 22 Drawing Sheets

APPARATUS AND METHODS FOR ELECTRONIC CONTENT PRESENTATION BASED ON BARCODE SCANS

FIELD OF THE INVENTION

The disclosure relates generally to electronic content presentation and, more specifically, to providing electronic content in response to the scanning of barcodes.

BACKGROUND

Barcodes, such as QR codes, are machine scannable images that can be read by computing devices with barcode scanning capability. Barcode images may include information about an item to which the barcode is attached. The information is included in the barcode when the barcode is generated. A capable computing device may scan a barcode using a camera, and may decipher the information from the scanned image. In some examples, the information directs the computing device to a website.

SUMMARY

In some examples, a computing device comprises at least one processor. The at least one processor may be configured to receive first data identifying a scanning, by a second computing device, of a code. The at least one processor may also be configured to determine at least one scanning action corresponding to the code based on the first data. The at least one processor may further be configured to execute the at least one scanning action. The at least one processor may also be configured to transmit second data to the second computing device identifying the initiation of the at least one scanning action.

In some examples, a computing device comprises at least one processor. The at least one processor may be configured to receive first data identifying at least one user action. The at least one processor may further be configured to configure a webpage to provide the at least one user action. The at least one processor may also be configured to generate a code that, in response to scanning the code by a second computing device, causes the second computing device to be directed to the webpage. The at least one processor may further be configured to provide the code for display.

In some examples, a method, by a computing device, includes receiving first data identifying a scanning, by a second computing device, of a code. The method may also include determining at least one scanning action corresponding to the code based on the first data. The method may further include executing the at least one scanning action. The method may also include transmitting second data to the second computing device identifying the initiation of the at least one scanning action.

In some examples, a computing device comprises a camera and at least one processor. The at least one processor may be configured to capture an image of a code with the camera, and execute a code reader to scan the image of the code. The at least one processor may also be configured to extract a link to a webpage from the scanned image of the code based on executing the code reader, where the webpage comprises a plurality of icons to initiate a plurality of corresponding user actions. The at least one processor may further be configured to display the webpage. The at least one processor may also be configured to receive a user input, and determine that the user input is an engagement of one of the plurality of icons. The at least one processor may also be configured to initiate the user action corresponding to the engaged one of the plurality of icons. In some examples, the user input is a single touch of the one of the plurality of icons.

In some examples, a first computing device comprising at least one processor. The at least one processor may be configured to receive, from a second computing device, first data identifying at least one user action. The at least one processor may also be configured to configure a webpage to provide the at least one user action. The at least one processor may further be configured to receive, from a third computing device, a request to access the webpage in response to the scanning of a code, and provide, to the third computing device, access to the webpage. The at least one processor may also be configured to receive, from the third computing device, a request to initiate the at least one user action. The at least one processor may further be configured to initiate the at least one user action in response to the received request.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
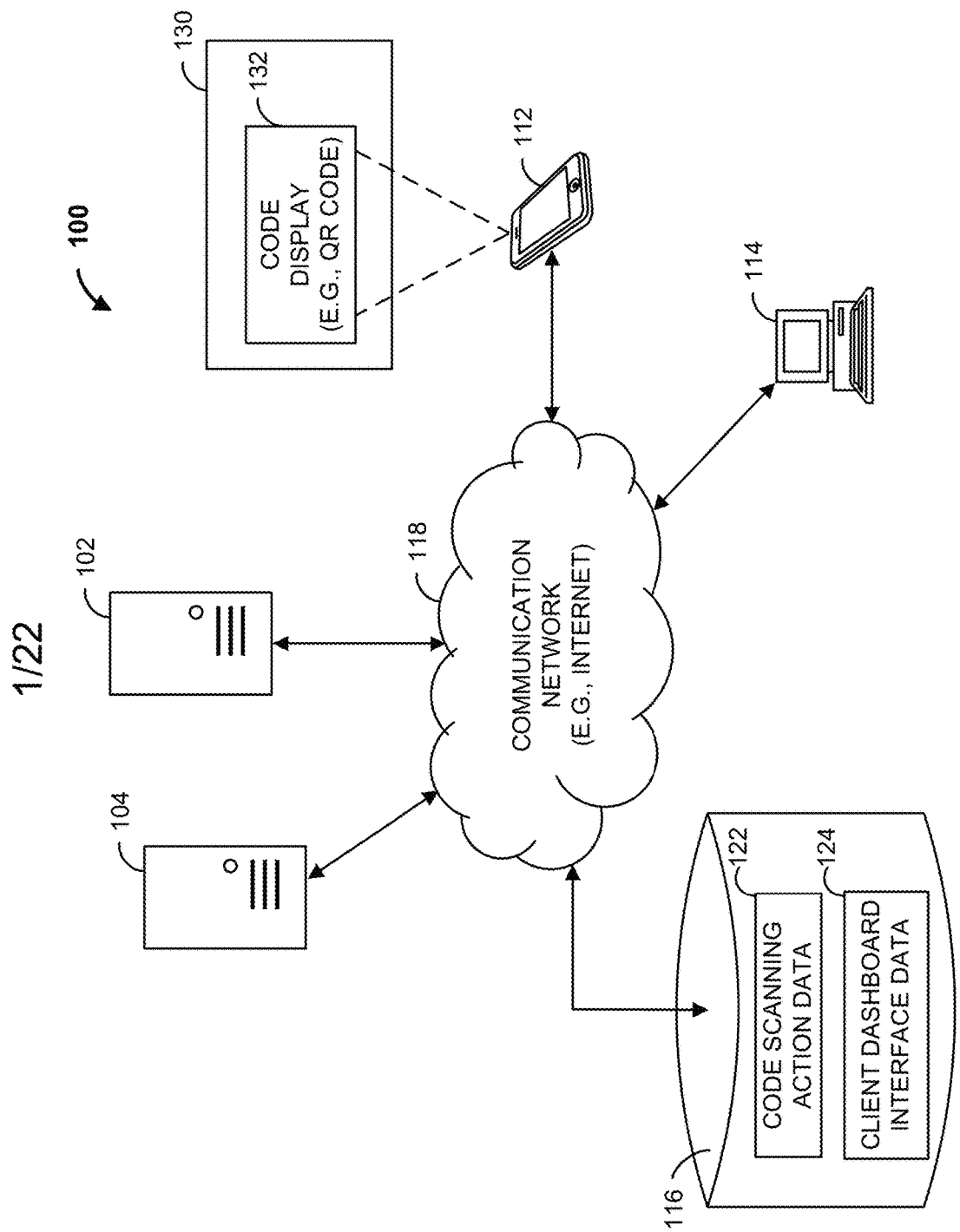
FIG. 1 illustrates a code scanning system in accordance with some embodiments.

The description of the preferred embodiments is intended to be read in connection with the accompanying drawings, which are to be considered part of the entire written description of these disclosures. It should be understood, however, that the present disclosure is not intended to be limited to the particular forms disclosed. Rather, the present disclosure covers all modifications, equivalents, and alternatives that fall within the spirit and scope of these exemplary embodiments.

In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

In some examples, a code scanning system includes code-based action determination computing device, a web server hosting a website, and a scanning device, such as a mobile device. The scanning device may scan a code, such as a quick response (QR) code, and in response, executes a scanning action based on data associated with (e.g., embedded in) the code. In some examples, the code-based action determination computing device provides a software platform. The software platform allows for the configuration of the scanning actions that can be taken upon the scanning of the code.

As used herein, "code" is used to refer to patterned codes that can be scanned and read by a sensor designed to receive and process electromagnetic waves (e.g., visible light, ultraviolet light, infrared light, radio frequency) to obtain desired information (e.g., product information). Examples of a code include, but are not limited to, QR codes, bar codes, and RFID chips.

In some examples, a scanning action causes the scanning device or a device communicatively coupled to the scanning device to be directed to a website hosted by a web server. The website may provide one or more user actions that a user of the scanning device can initiate. In some examples, the software platform provided by a code-based action determination computing device also allows for the configuration of the user actions.

In some examples, each code is associated with, among other information, a client of the software platform. Each client may have an account associated with the software platform, where the software platform allows the client to select and/or configure scanning actions and user actions.

Among other advantages, rather than having to recreate new codes to execute new actions, clients can modify the actions to be taken for any specific code on the software platform itself, as well as actions that can be made available to a customer on a website after scanning a code.

Turning to the drawings, FIG. 1 shows a block diagram of a code scanning system 100 that includes a code-based action determination computing device 102 (e.g., a server, such as an application server), a web server 104, a database 116, a scanning device 112, and a client computing device 114 operatively coupled over a network 118. Each of code-based action determination computing device 102, web server 104, scanning device 112, and client computing device 114 can include one or more processors, one or more field-programmable gate arrays (FPGAs), one or more application-specific integrated circuits (ASICs), one or more state machines, digital circuitry, or any other suitable circuitry.

For example, code-based action determination computing device 102, web server 104, scanning device 112, and client computing device 114 can each be a mobile device such as a cellular phone, a laptop, a computer, a tablet, a personal assistant device, a voice assistant device, a digital assistant, a server such as a cloud-based server, or any other suitable computing device. Although, as illustrated, code scanning system 100 includes one of each of these devices, code scanning system 100 can include any number of code-based action determination computing devices 102, web servers 104, scanning devices 112, databases 116, and client computing devices 114.

Code scanning system 100 also includes a platform 130 that displays one or more codes 132, such as a QR code. Platform 130 may be any product, material, device, advertisement, display, or any other platform capable of displaying code 132. In some examples, platform 130 is a display configured to receive and display images, such as images that include scannable codes 132. Scanning device 112 may be configured to scan codes, such as code 132. For example, scanning device 112 may include a camera and a software application that executes on a computing device. The camera may capture an image of a code, such as a QR code, and the software application may extract information from the captured code image. The extracted information may include, for example, web address information such as links to webpages. In response to scanning a code, a web browser of scanning device 112 may be directed to the webpage via a link, for example.

Code-based action determination computing device 102 is operable to communicate with database 116 over communication network 118. For example, fraud detection computing device 102 can store data to, and read data from, database 116. Database 116 can be a remote storage device, such as a cloud-based server, a memory device on another application server, a networked computer, or any other suitable remote storage. Although shown remote to code-based action determination computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Scanning device 112 can communicate with web server 104 over communication network 118. For example, web server 104 may host one or more webpages of a website, such as a website that code 132 includes a link to. Scanning device 112 may be operable to view, access, and interact with the webpages hosted by web server 104. In some examples, web server 104 hosts a webpage that provides one or more user actions. For example, scanning device 112 may scan code 132 and be directed to the webpage hosted by web server 104. The webpage may allow the operator of scanning device 112 to initiate one or more user actions. The user actions may include, for example, saving a link to the webpage, sending a communication such as an email or SMS (e.g., text) message, or having product information (e.g., brochure data) sent to scanning device 112. Other example user actions include having a call placed to scanning device 112 (e.g., from a representative for a product), proceeding to another webpage (e.g., a product's webpage), requesting a sample of a product, initiating a call to a representative of the product, or getting a quote for the product.

Figure 2:
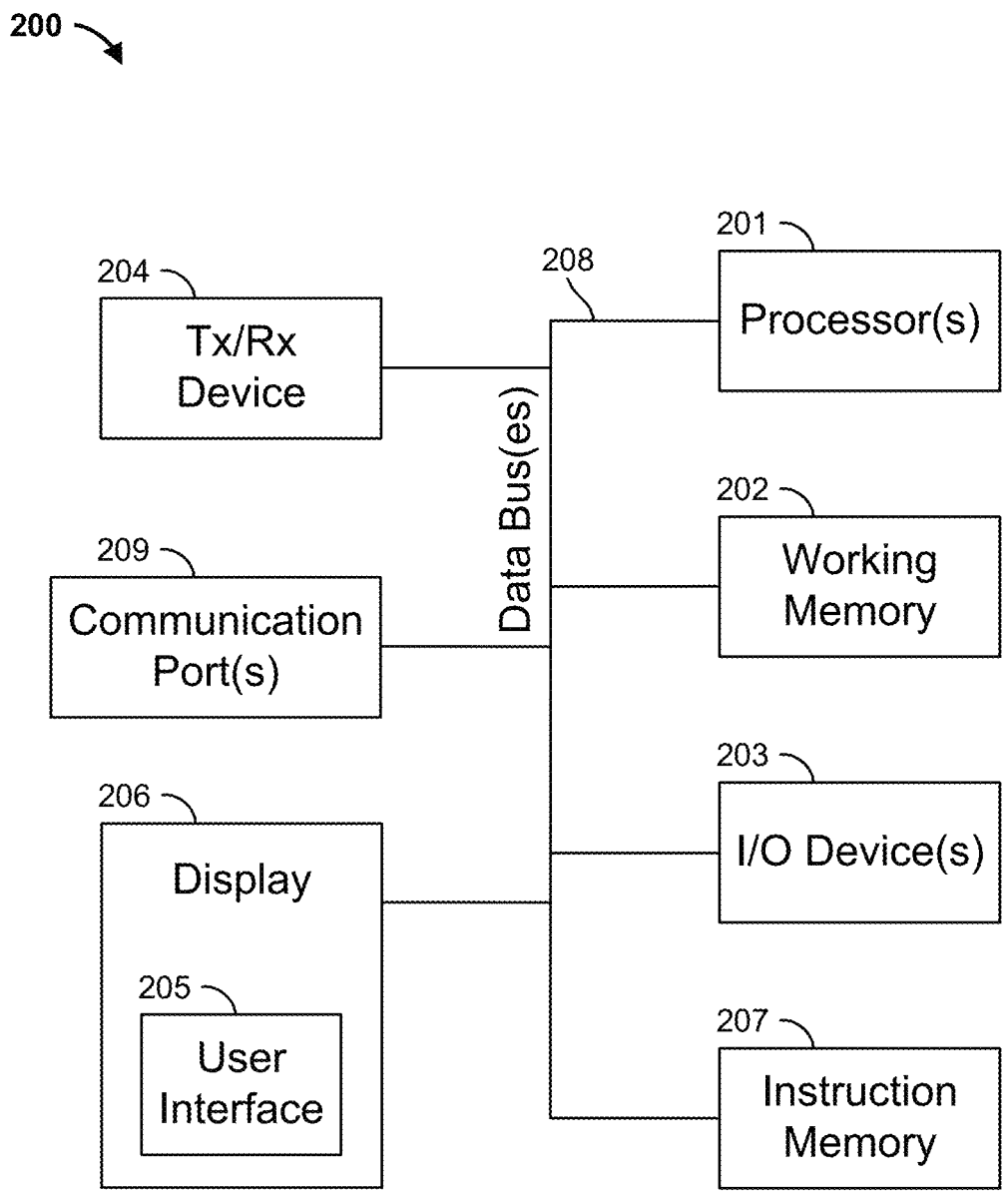
FIG. 2 illustrates an example of a code-based action determination computing device of the code scanning system of FIG. 1 in accordance with some embodiments.

FIG. 2 illustrates more details of code-based action determination computing device 102. As illustrated in FIG. 2, code-based action determination computing device 102 may include one or more processors 201, a working memory 202, one or more input/output devices 203, an instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processor(s) 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processor(s) 201 can be configured to perform a certain function or operation by executing code, stored on instruction memory 207, embodying the function or operation. For example, processor(s) 201 can be configured to perform one or more of any function, method, or operation disclosed herein.

Instruction memory 207 can store instructions that can be accessed (e.g., read) and executed by processor(s) 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processor(s) 201 can store data to, and read data from, working memory 202. For example, processors 201 can store a working set of instructions to working memory 202, such as instructions loaded from instruction memory 207. Processors 201 can also use working memory 202 to store dynamic data created during the operation of code-based action determination computing device 102. Working memory 202 can be a random access memory (RAM) such as a static random access memory (SRAM) or dynamic random access memory (DRAM), or any other suitable memory.

Input-output device(s) 203 can include any suitable device that allows for data input or output. For example, input-output device(s) 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allows for the programming of executable instructions in instruction memory 207. In some examples, the communication port(s) 209 allow for the transfer (e.g., uploading or downloading) of data, such as data to configure scanning actions to be taken upon the scanning of a code, such as code 132.

In some embodiments, display 206 can display user interface 205 and function as an input/output device 203. User interfaces 205 can enable user interaction with code-based action determination computing device 102. For example, user interface 205 can be a user interface for an application that allows for the viewing and manipulation of images of materials as well as material data. In some examples, a user can interact with user interface 205 by engaging input-output devices 203.

Transceiver 204 may be any suitable communication unit that allows for communication with a network, such as communication network 118 of FIG. 1. In some examples, transceiver 204 is selected based on the type of communication network 118 code-based action determination computing device 102 will be operating in. For example, if communication network 118 of FIG. 1 is a WiFi® network, transceiver 204 is configured to allow communications with the WiFi® network. Processor(s) 201 is operable to receive data from, or send data to, a network, such as communication network 118 of FIG. 1, via transceiver 204.

Turning back to FIG. 1, code 132 can cause scanning device 112 to be directed, via a link, to a webpage. In response to scanning code 132, a web browser, executed by scanning device 116, is directed to the webpage. The webpage may be hosted by web server 104, for example, and may include a plurality of user actions that may be initiated. For example, the webpage may include one or more user actions allowing a customer to save a link to the webpage, send a communication such as an email or SMS message, or have product information sent to scanning device 112. The webpage may also include one or more user actions allowing a customer to receive a call from a representative for a product, proceed to a product's webpage, request a sample of a product, initiate a call to a representative of the product, or receive a quote for the product. Although this discussion relates to directing a device to a webpage, it should be understood that the processes and techniques described herein could also be performed by directing a device of another application, such as those commonly referred to as apps.

Figure 11:
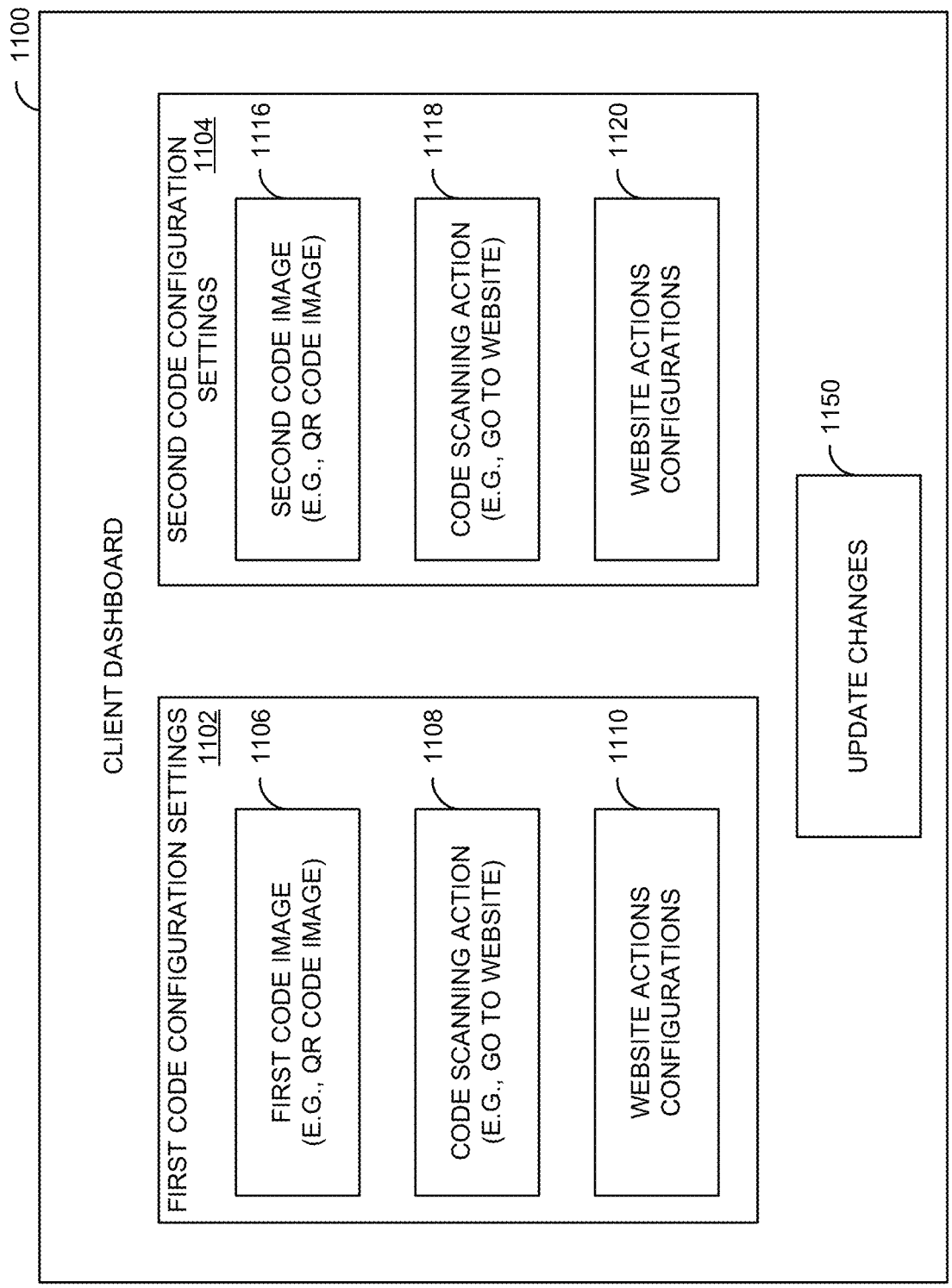
FIG. 11 illustrates a client dashboard where webpages and corresponding scanning actions and user actions can be configured in accordance with some embodiments.

Code-based action determination computing device 102 can be configured to provide a software platform that allows for the configuration of these user actions. For example, database 116 may store client dashboard interface data 124, which may include executable instructions that characterize a client dashboard allowing for the configuration of user actions. The client dashboard may be made accessible (e.g., via a webpage) to client computing devices 114 over network 118. The client dashboard may allow clients to log in and manage user actions that are available on a webpage in response to the scanning of codes corresponding to a particular client. FIG. 11, described further below, illustrates one example of such a client dashboard.

Code-based action determination computing device 102 may obtain client dashboard interface data 124 from database 116, and execute client dashboard interface data 124 to provide the client dashboard. After logging in, for example, a client may configure one or more user actions that are made available on a website or app, such as one hosted by web server 104, that is accessed in response to the scanning of one of the client's codes. Code-based action determination computing device 102 may generate code scanning action data 122 identifying and characterizing the user actions for each client, and may store code scanning action data 122 in database 116.

Figure 3:
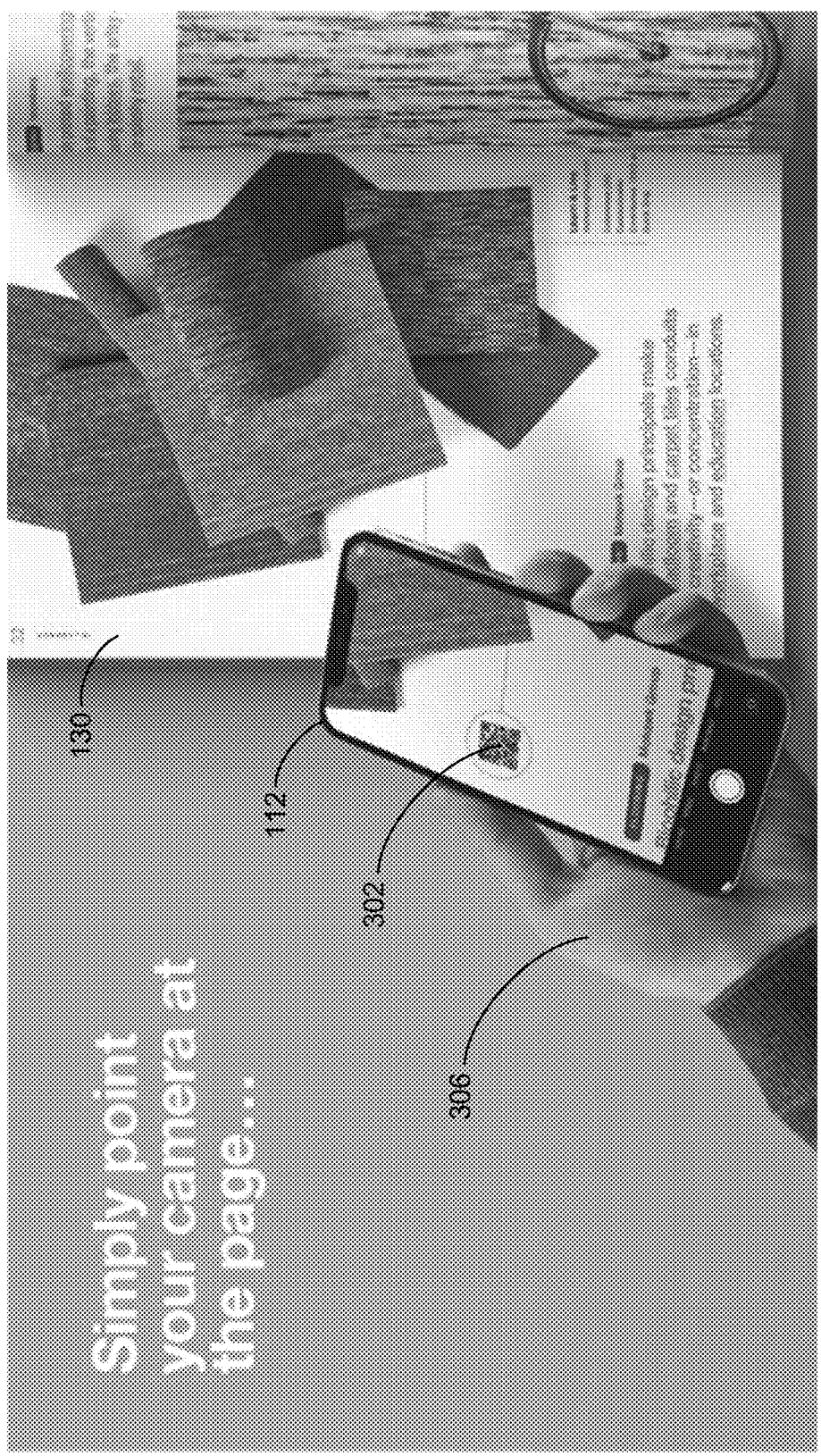
FIG. 3 illustrates the scanning of a code in accordance with some embodiments.

FIG. 3 illustrates scanning device 112 scanning a code 302 from a platform 130. Code 302 may be a QR code, for example. Code 302 may be displayed near an advertisement, such as an advertisement for products (e.g., design materials) advertised in a magazine. Design materials may include, but are not limited to, flooring such as carpet, tile, and wood, fabrics, paints, or any other design material. A user 306 may operate scanning device 112 to scan code 302 with a scanning application (e.g., QR code reader) that captures an image of the code via a camera (on opposite face of the phone in FIG. 3) of scanning device 112. Upon the scanning of the code, a web browser of scanning device 102 may be directed to a webpage, such as one hosted by web server 104, or the scanning device 112 can be directed to open an application that pulls information from web server 104. In some examples, rather than being redirected to a webpage, the scanning of the code causes scanning device 112 to launch an application that includes screens or pages similar to the webpages discussed below with respect to following figures.

Figure 4A:
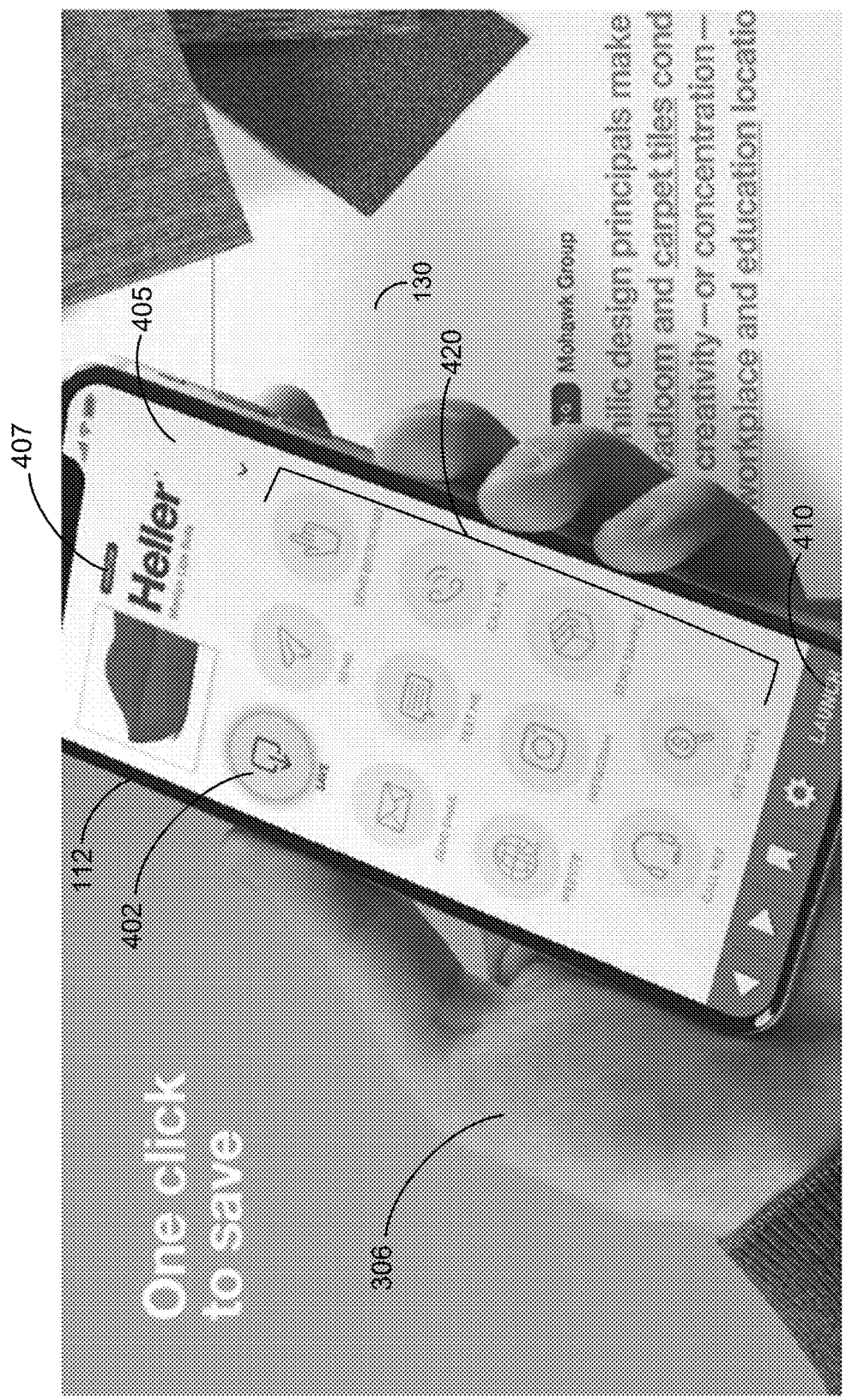
FIGS. 4A, 4B, and 4C illustrate an example landing page provided in response to a scanned code and subsequent pages upon selection of the save option in accordance with some embodiments.

FIG. 4A illustrates an example of such a webpage. Specifically, FIG. 4A illustrates scanning device 112 displaying webpage 405. Webpage 405 includes product information 407, which may include an image of the product, and data identifying one or more of the product name, the product manufacture, and the product retailer. Webpage 405 also includes a plurality of icons 420. In some examples, one or more of the plurality of icons 420 may take an action based on a user engagement (e.g., touch, click) of the icon. In some examples, the action is taken in response to a single user engagement (e.g., a single touch or click) of the icon.

Figure 4B:

For example, the plurality of icons 420 in FIGS. 4A, 5A, 6A, 7A, 8A, 9A, and 10 includes save icon 402. By engaging save icon 402, scanning device 112 transmits request data to web server 104 that causes web server 104 to save product information 407 to a user's account (e.g., user of scanning device 112). In response, web server 104 may transmit response data to scanning device 112 confirming that the product was added to the user's account. For example, scanning device 112 may display saved confirmation icon 404, as illustrated in FIG. 4B, based on receiving the response data from web server 104.

Figure 4C:

A user of scanning device 112 may view all products saved to the user's account by engaging launch icon 410. For example, as illustrated in FIG. 4C, scanning device 120 may display a webpage with product information 420 for saved products, such as design materials. In this example, images of various design materials are illustrated, which correspond to design materials that a user saved to their account (e.g., by engaging save icon 402).

Figure 5A:
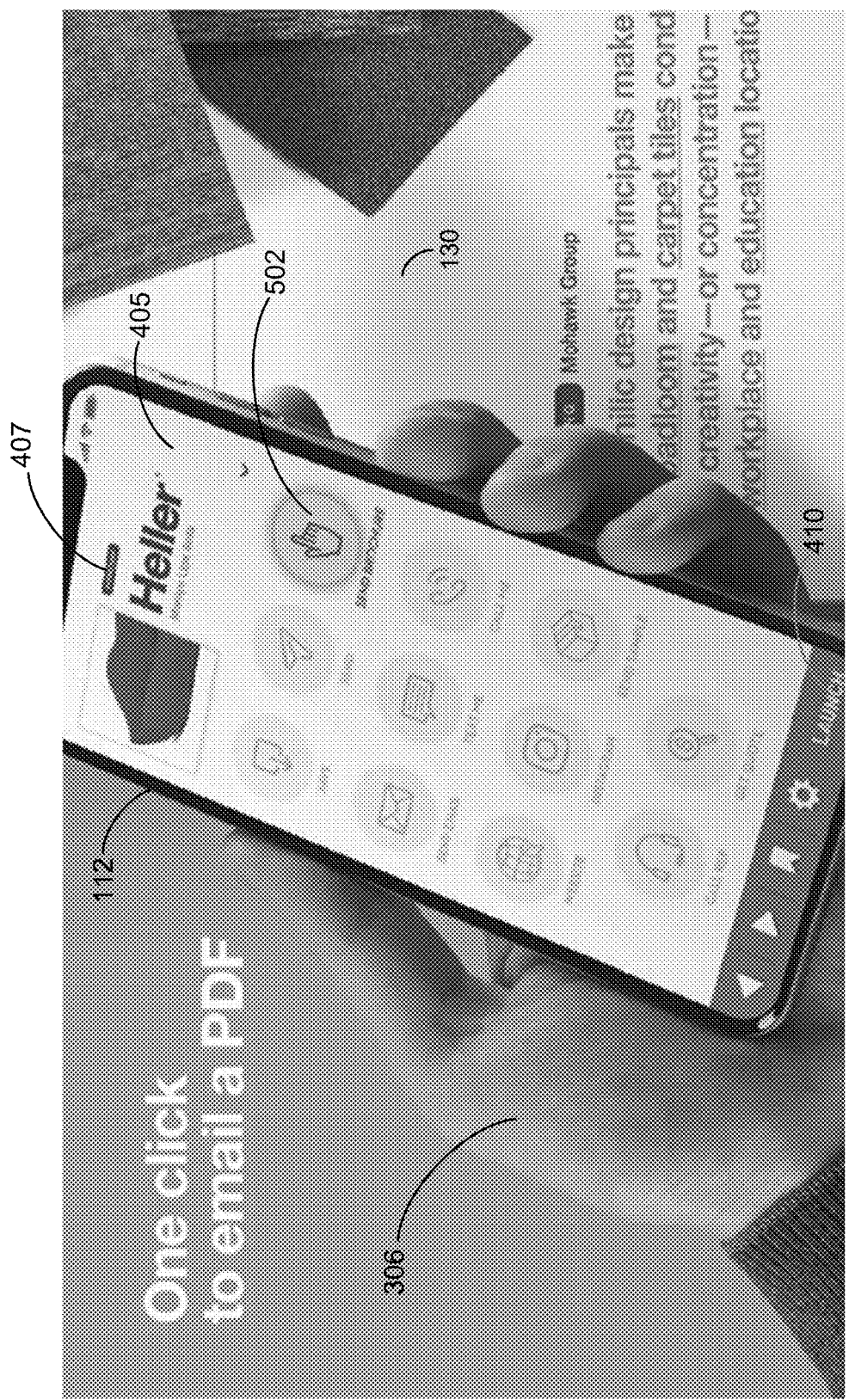
FIGS. 5A and 5B illustrate an example landing page provided in response to a scanned code and a subsequent page upon selection of a send brochure option in accordance with some embodiments.

As illustrated in FIG. 5A, webpage 405 can also include a send brochure icon 502. In response to an engagement of send brochure icon 502, scanning device transmits request data to web server 104 requesting product information, such as a digital brochure (e.g., a document in PDF format), for the product corresponding to product information 407. In response, web server 104 may transmit a communication, such as an email or SMS message, to the user (e.g., based on communication preferences associated with the user's account) that includes the product information.

Figure 5B:

In some examples, web server 104 transmits response data to scanning device 112 that includes the product information. For example, FIG. 5B illustrates a webpage 504 showing a brochure may be displayed by scanning device 112 in response to receiving the response data. The webpage 504 may include, for example, images 506 of the product, which may include the product in various colors or materials. The webpage 504 may also include product descriptions 510. Product descriptions 510 may include, for example, construction descriptions describing what the construction of the product (e.g., materials, construction type, etc.). Product descriptions 510 may also include performance descriptions describing the performance of the product, and color descriptions describing available colors for the product. Product descriptions 510 may also include any other information related to the product, including, for example, manufacture information, and retailer information.

Figure 6A:
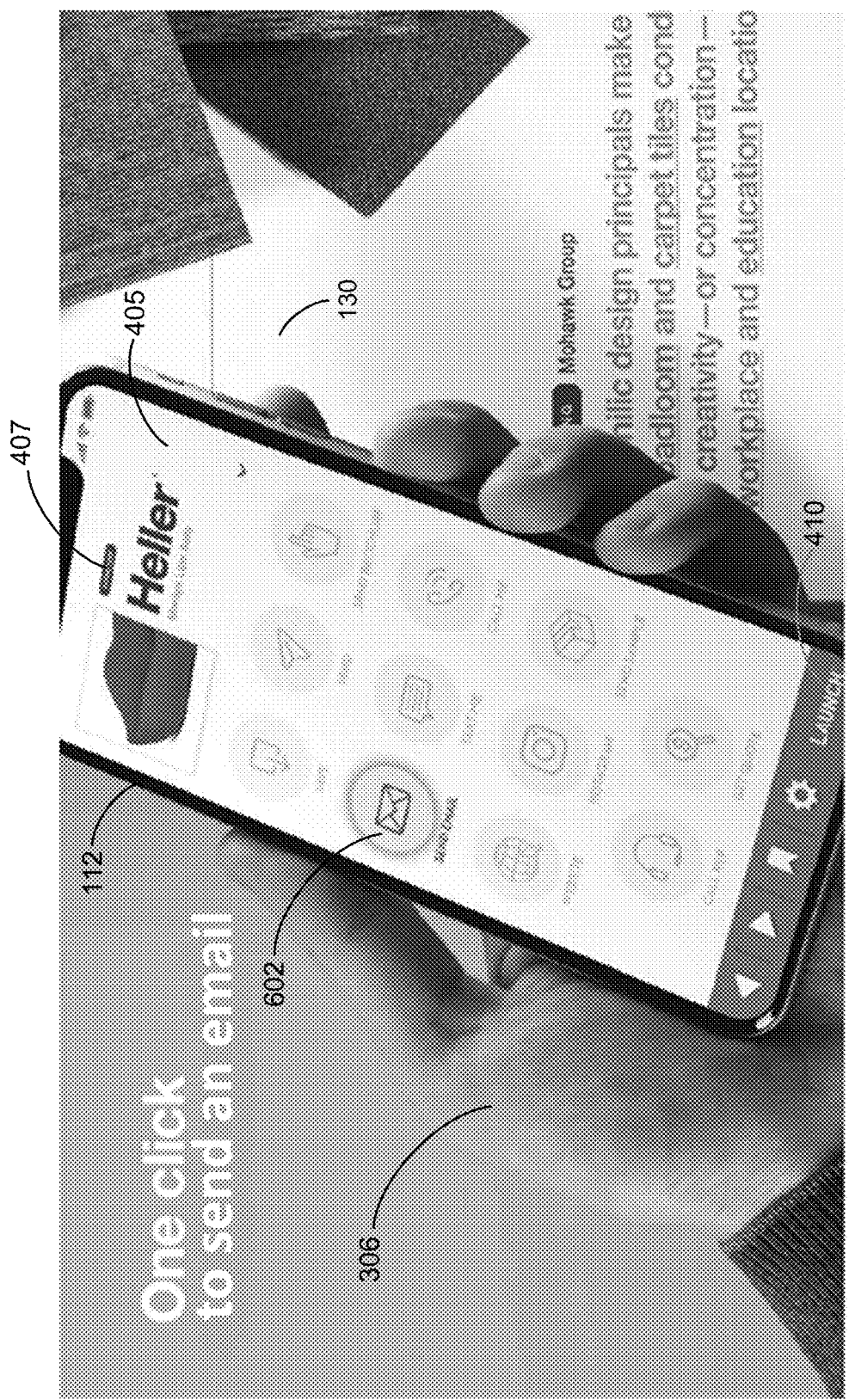
FIGS. 6A and 6B illustrate an example landing page provided in response to a scanned code and a subsequent page upon selection of a send email option in accordance with some embodiments.
Figure 6B:
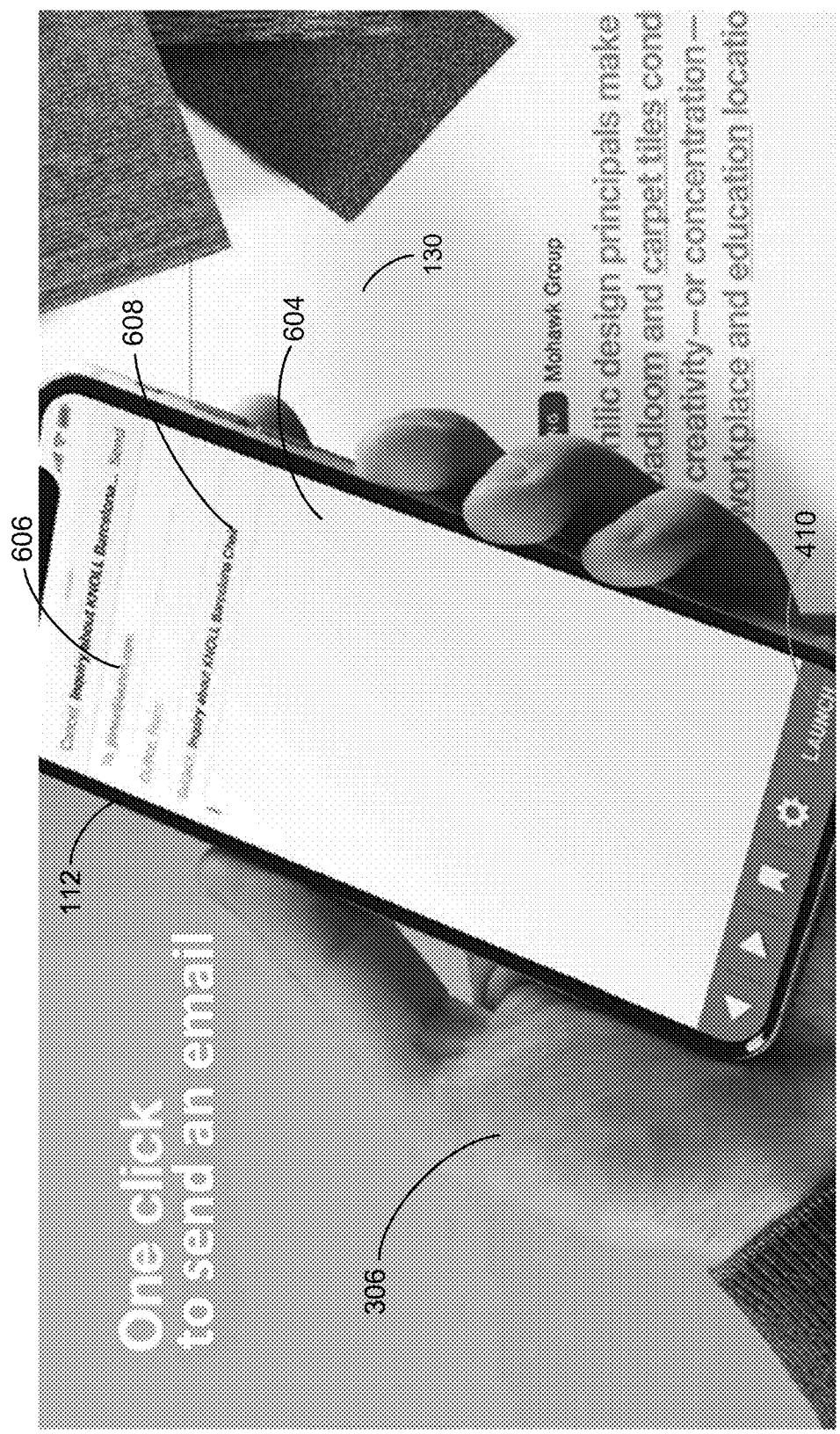

FIG. 6A illustrates send email icon 602 on webpage 405. In response to an engagement (e.g., one click, one touch) of send email icon 602, an email may automatically be initiated. The email may automatically populate the email destination field of the email with an email address, such as an email address associated with a manufacture or a retailer of the product corresponding to product information 407. A client may configure the destination email address in the client dashboard, which described in further detail below. For example, as illustrated in FIG. 6B, email 604 may be automatically initiated in response to an engagement of send email icon 602. Destination email address 606 may automatically be populated, as well as email subject 608. User 306 may input text into email 604, and cause scanning device 112 to transmit the email to destination email address 606 by engaging send icon 610.

Figure 7A:
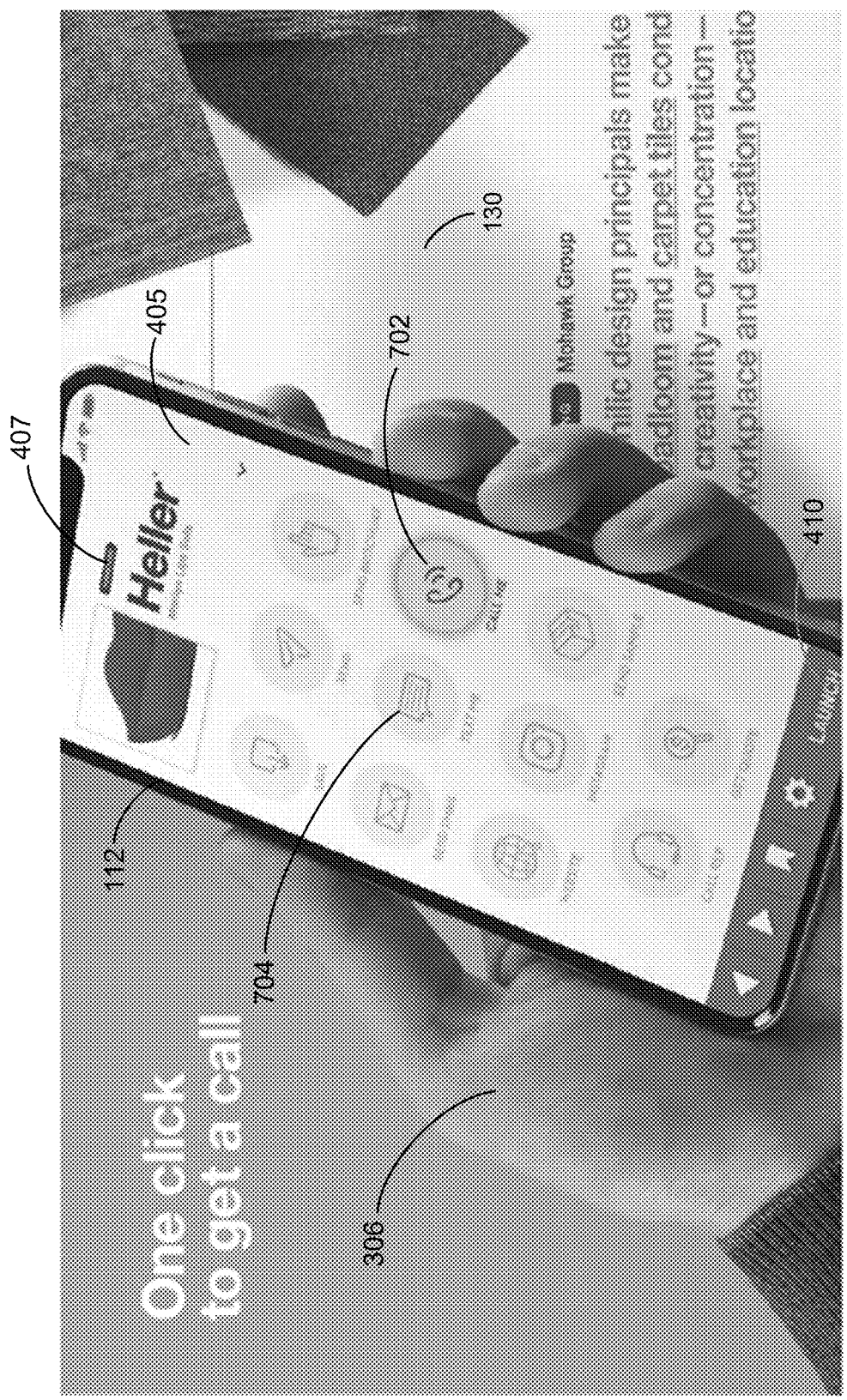
FIGS. 7A and 7B illustrate an example landing page provided in response to a scanned code and a subsequent page upon selection of a call me option in accordance with some embodiments.

FIG. 7A illustrates a text me icon 705 and a call me icon 702. In response to an engagement of text me icon 704, scanning device 112 may transmit data to another computing device, causing the other computing device to transmit an SMS (e.g., text) message to scanning device 112. For example, upon engagement of text me icon 704, scanning device 112 may transmit a text message destined to a preconfigured telephone number (e.g., preconfigured in the client dashboard) associated with a computing device, such as a mobile phone. A user of the computing device may cause the computing device to generate a text message in response. In some examples, the response text message is automatically generated by the computing device. The computing device may be operated by, for example, a manufacture or retailer of the product on which the code is displayed. The response text message may include contact information, such as contact information for the manufacturer or retailer, product information (e.g., brochure data), pricing information, or any other information.

Figure 7B:

As another option, webpage 405 includes call me icon 702. In response to an engagement of call me icon 702, scanning device 112 may cause a computing device to initiate a telephone call to scanning device 112. For example, in response to engaging call me icon 702, scanning device 112 may send data to another computing device indicating that a call is to be placed to scanning device 112. The data may identify a phone number associated with scanning device 112. FIG. 7B illustrates scanning device 112 receiving a telephone call 706 in response to the engagement of call me icon 702 by user 306.

Figure 8A:
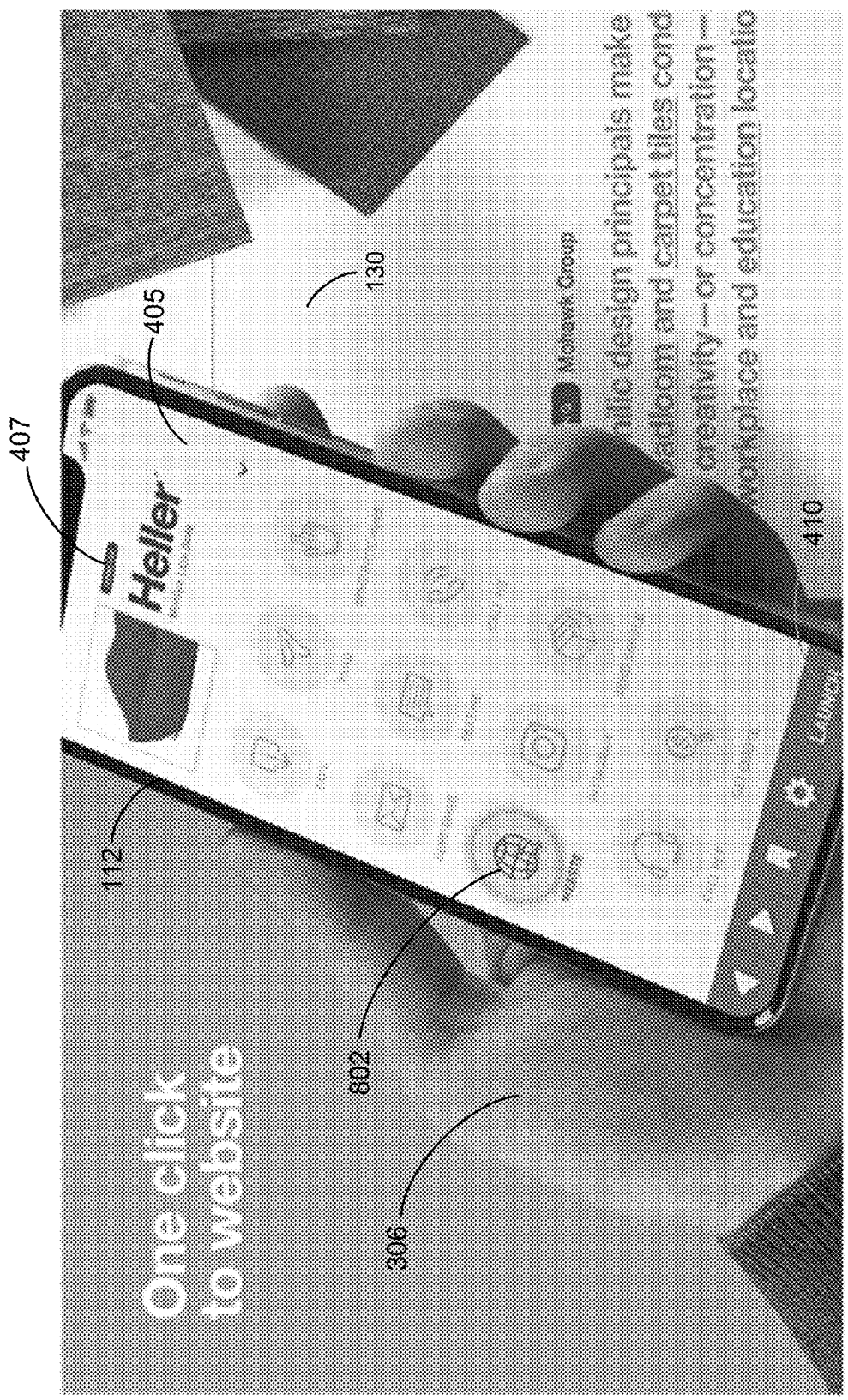
FIGS. 8A and 8B illustrate an example landing page provided in response to a scanned code and a subsequent page upon selection of a webpage option in accordance with some embodiments.
Figure 8B:
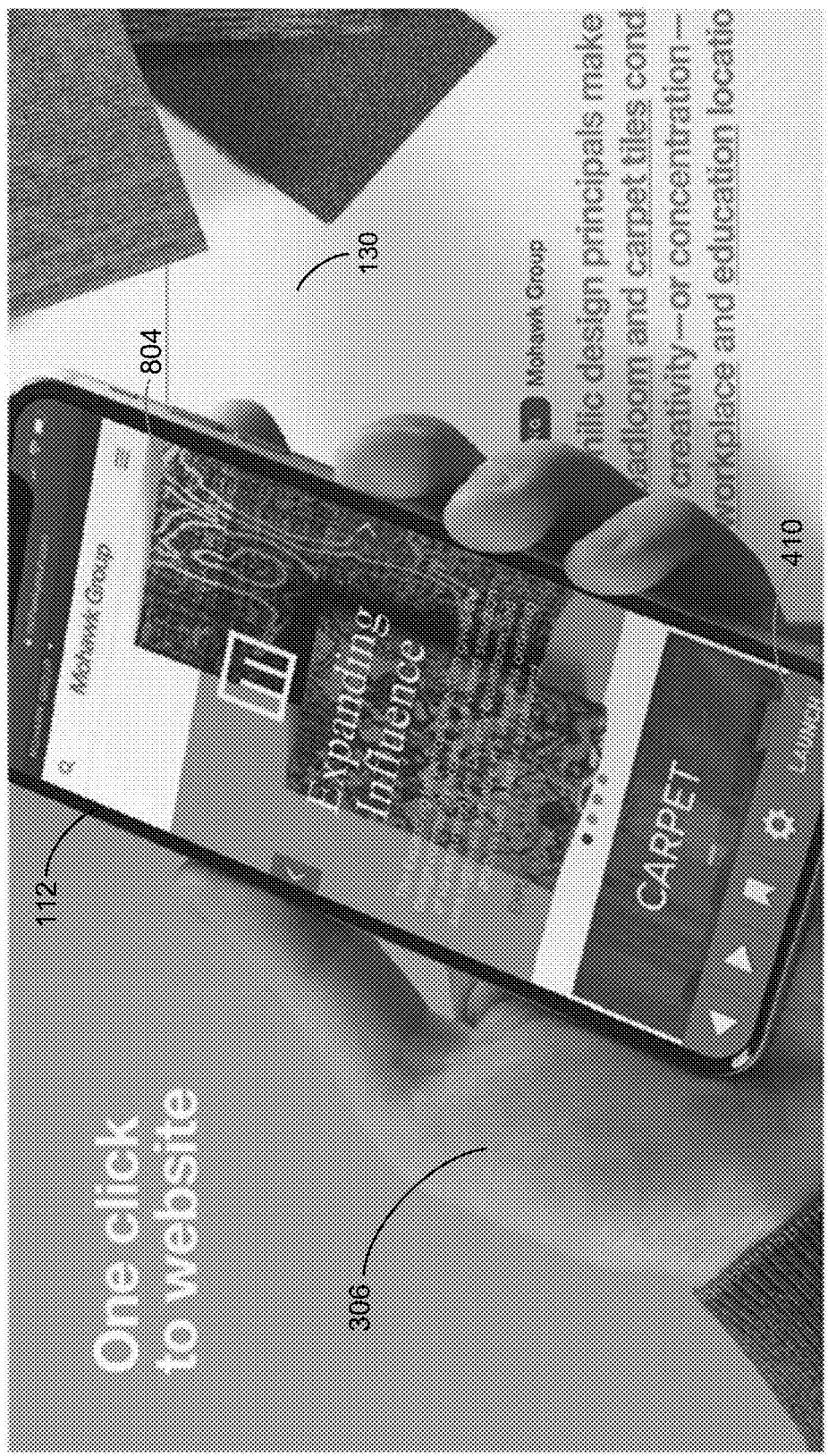

FIG. 8A illustrates website icon 802 which, upon its engagement, causes scanning device 112 to display a pre-configured website. For example, upon engaging website icon 802, a web browser executed by scanning device 112 may be directed to the website. The website may be pre-configured to run in the client dashboard. The website may be a website for the product associated with product information 407, for example. FIG. 8B illustrates scanning device 112 displaying a website 804 in response to user 106 providing a single touch of website icon 802.

Figure 9A:
FIGS. 9A and 9B illustrate an example landing page provided in response to a scanned code and subsequent page upon selection of a send sample option in accordance with some embodiments.
Figure 9B:
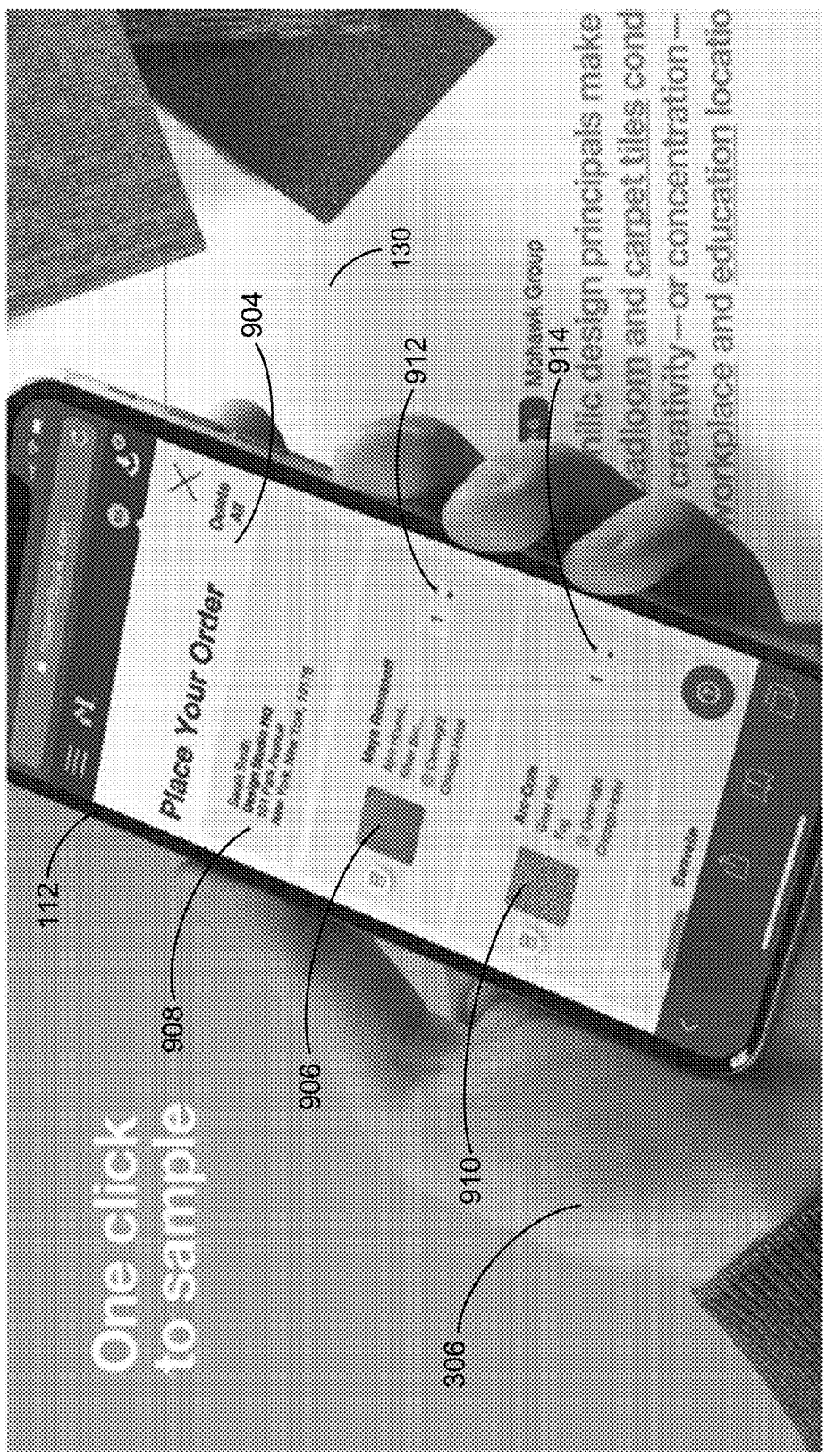

FIG. 9A illustrates send sample icon 902. In response to an engagement of the send sample icon 902, scanning device 112 is directed to a webpage that allows for the request of one or more samples of the product associated with product information 407. The webpage may allow user 306 to select one or more types (e.g., styles, sizes, colors, etc.) of the product for delivery to user 306. For example, FIG. 9B illustrates a webpage 904 that allows for the request of product samples for a product (e.g., the product on which or adjacent to which the code was displayed). In some embodiments, webpage 904 illustrates a first product type 906 for the product, along with a first product quantity selection 912, which allows user 306 may to request a quantity of samples for the first product type 906 of the product. Webpage 904 also illustrates a second product type 910, as well as a second product quantity selection 914 for the second product type 910 of the product. User 306 may submit the order for the selected types of product samples by engaging a submit icon (not illustrated). Upon engaging the submit icon, scanning device 112 may send data to another computing device, such as client computing device 114, where the data identifies user 306 (e.g., contact information, address information, etc.) and the requested product (e.g., product types and quantities).

Figure 10:
FIG. 10 illustrates an example landing page with exemplary user actions that can be provided in response to a scanned code in accordance with some embodiments.

FIG. 10 illustrates social media icon 1006, call representative icon 1002, get quote icon 1004, and send icon 1008. Upon engagement of social media icon 1006, scanning device 112 may be directed to a social media page, such as one associated with a product. For example, engaging social media icon 1006 may cause an application associated with the corresponding social media to display the social media page. In some examples, engaging social media icon 1006 causes a web browser executed by scanning device 112 to be directed to the social media page. In some examples, the social media webpage is operated by a manufacturer or retailer of the product.

Call representative icon 1002 allows for calling of a representative, such as a representative of the manufacture or retailer of the product. For example, upon engaging call representative icon 1002, scanning device 112 may initiate a call to a preconfigured number associated with a representative for the product.

Get quote icon 1004 allows for the obtaining of a price for the product. For example, upon engaging get quote icon 1004, scanning device 112 may be directed to a webpage that displays the price for the product. In some examples, the webpage allows for the purchase of the product as well. In some examples, upon engaging get quote icon 1004, scanning device 112 generates data requesting a quote for the product. The data may be transmitted to one or more computing devices, such as client computing device 114. A computing device receiving the data may response with one or more price quotes for the product.

Send icon 1008 allows for the sending of product information 407 for the product associated with product information 407 to another, such as a friend or colleague. For example, upon engaging send icon 1008, scanning device 112 may automatically populate a communication, such as an email or SMS (e.g., text) message, with at least a portion product information 407. User 306 may specify the recipient of the communication, and may cause scanning device 112 to send the communication to another computing device (e.g., a mobile device of a colleague or friend).

FIG. 11 illustrates an example client dashboard 1100. Client dashboard 1100 may be provided by, for example, code-based action determination computing device 102. For example, code-based action determination computing device 102 may provide client dashboard as a webpage. A client may log in to client dashboard 1100 (e.g., via a web browser executed by client computing device 114), and configure scanning actions associated with the scanning of corresponding codes (e.g., QR codes). As illustrated, client dashboard 1100 includes first code configuration settings 1102 and second code configuration settings 1104. The corresponding codes may QR codes, for example. First code configuration settings 1102 may be associated with a first code (e.g., first QR code), and second code configuration settings 1104 may be associated with another code (e.g., second QR code). Although this example assumes two codes are associated with a corresponding client, a client may be associated with any number of codes. For example, client dashboard 1100 may allow for configuration settings of any number of codes.

Each of first code configuration settings 1102 and second code configuration settings 1104 includes a code image 1106, 1116, a code scanning action 1108, 1118, and website action configurations 1110, 1120. For example, first code configuration settings 1102 includes first code image 1106, which may be an image of the corresponding first code. First code configuration settings 1102 also includes code scanning action 1108. Code scanning action 1108 allows a client to configure an action that is taken when the first code is scanned, such as by scanning device 112. For example, code scanning action 1108 may allow a client to specify a website that a scanning device 112 is to be directed to when first code is scanned. The website may be one hosted by web server 104, for example. To enable this functionality, code-based action determination computing device 102 may generate first code with a link to the website. For example, code-based action determination computing device 102 may execute a code generator, such as a QR code generator, to generate first code with a link to the website. In some examples, the website is to a website associated with a product. Code scanning action 1108 allows other scanning actions to be taken as well upon the scanning of the first code.

First code configuration settings 1102 also includes website actions configurations 1110. Website actions configurations 1110 allows a client to configure available user actions to a customer that is visiting a website in response to the scanning of the first code. For example, website actions configurations 1110 can allow a client to configure available user actions on a website identified by code scanning action 1108 (e.g., such as a website hosted by web server 104). For example, website actions configurations 1110 may allow a client to configure the website to include one or more user actions including allowing a customer to save a link to the webpage, send a communication such as an email or SMS message, or have product information sent to scanning device 112. The one or more user actions may also include allowing a customer to receive a call from a representative for a product, proceed to a product's webpage, request a sample of a product, initiate a call to a representative of the product, or receive a quote for the product, for example.

Similarly, second code configuration settings 1104 includes second code image 1116, which may be an image of the corresponding second code. Second code configuration settings 1104 also includes code scanning action 1118, allowing for the client to configure an action that is taken when the second code is scanned. Further, second code configuration settings 1104 includes website actions configurations 1120, which can allow the client to configure available scanning actions on a website identified by code scanning action 1118.

To have first code configuration settings 1102 and/or second code configurations settings 1104 take effect, a user may engage update changes icon 1150. For example, upon engaging update changes icon 1150, a first code may be generated based on code scanning action 1108, and a second code may be generated based on code scanning action 1118. In addition, a website may be updated with user actions based on website actions configurations 1110 and website actions configurations 1120. For example, for a website hosted by web server 104, code-based action determination computing device 102 may generate data identifying and characterizing the configured user actions, and may transmit the data to web server 104. Web server 104 may then update the webpage based on the received data.

Figure 12A:
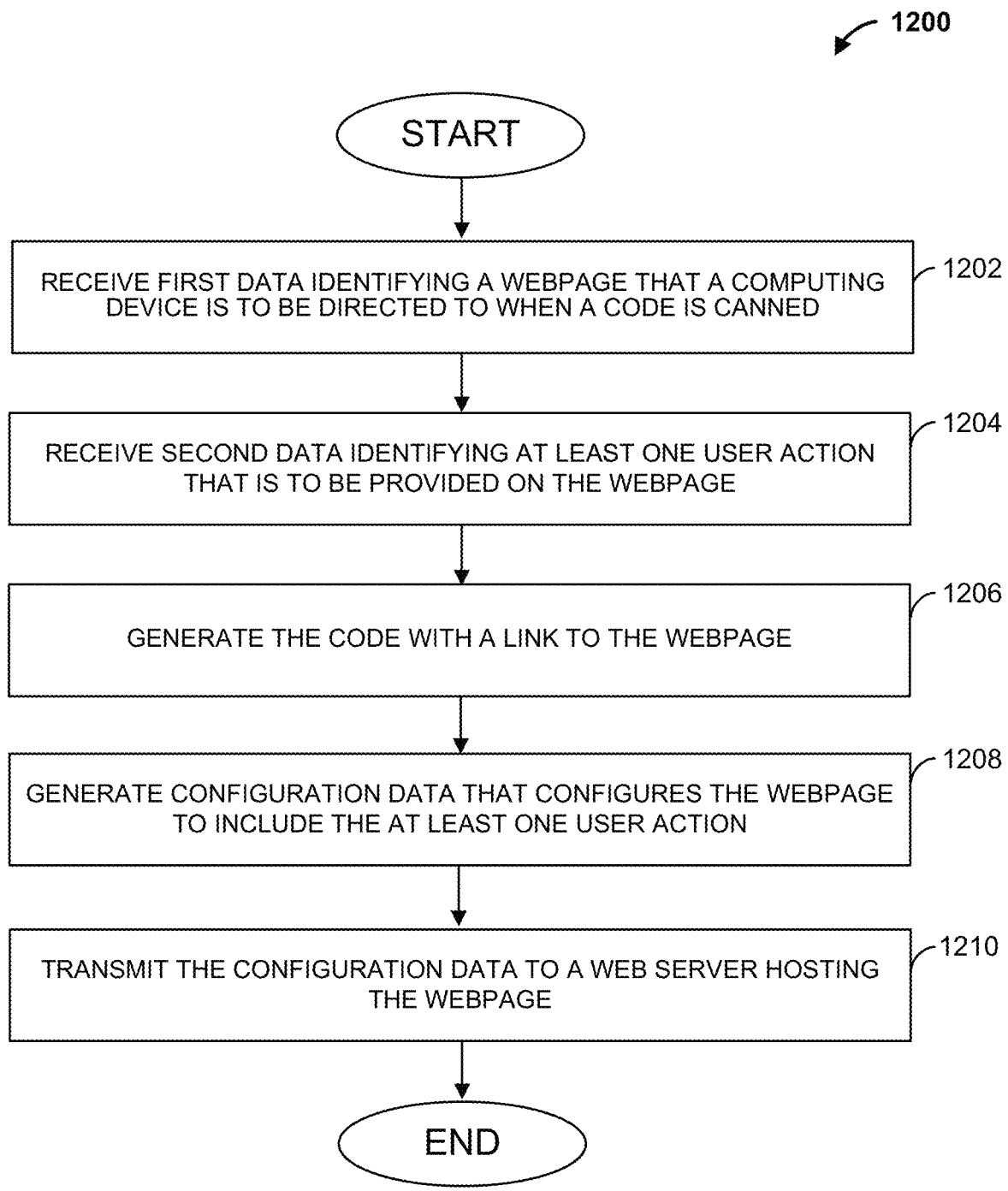
FIGS. 12A, 12B, and 12C illustrate example methods that may be performed by the code scanning system of FIG. 1 in accordance with some embodiments.

FIG. 12A illustrates a flowchart of another example method 1200 that may be carried out by, for example, the code-based action determination computing device 102 of FIG. 1. Beginning at step 1202, first data is received identifying a webpage that a computing device is to be directed to when a code is scanned. For example, a client may provide on client dashboard 1100, via client computing device 114, code scanning action 1108 identifying the webpage. Client dashboard 1100 can be hosted by code-based action determination computing device 102. At step 1204, second data is received identifying at least one user action that is to be provided on the webpage. For example, the client may provide website actions configurations 1110 on client dashboard 1100, hosted by code-based action determination computing device 102, via client computing device 114. At step 1206, the code is generated, where the code includes a link to the webpage. For example, code-based action determination computing device 102 may execute a code generator, such as a QR code generator, to generate the code with the link to the webpage. At step 1208, configuration data is generated. The configuration data configures the webpage to include the at least one user action. For example, code-based action determination computing device 102 may generate the configuration data to configure the webpage to provide the at least one user action. At step 1210, the configuration data is transmitted to a web server hosting the webpage. For example, code-based action determination computing device 102 may transmit the configuration data to web server 104. Web server 104 may configure the webpage based on the configuration data. The method then ends.

Figure 12B:
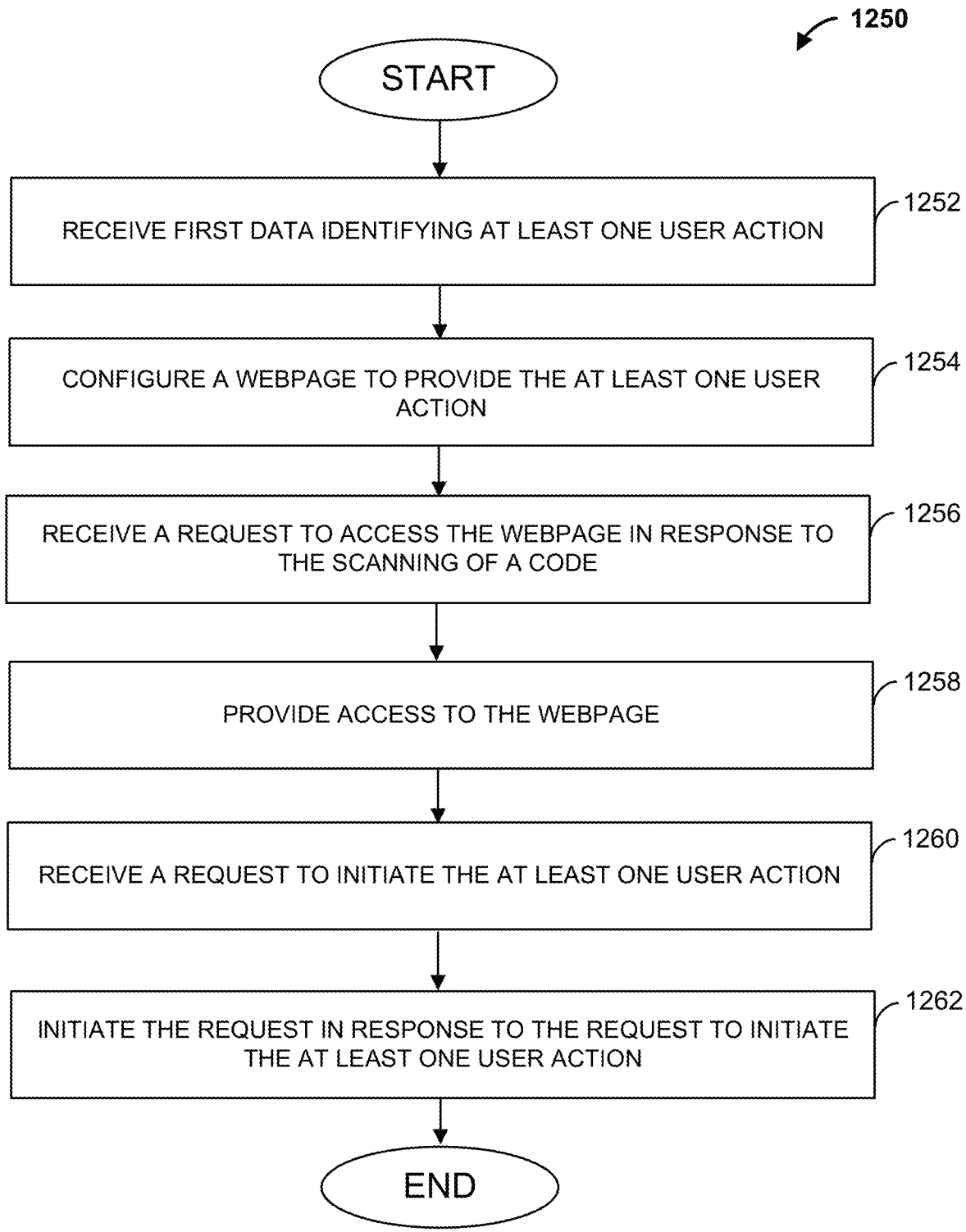

FIG. 12B illustrates a flowchart of an example method 1250 that may be carried out by, for example, the web server 104 of FIG. 1. Beginning at step 1252, first data is received identifying at least one user action. For example, code-based action determination computing device 102 may transmit website action configurations 1110 to web server 104. At step 1254, a webpage is configured to provide the at least one user action. For example, code-based action determination computing device 102 may generate and transmit data to web server 104. Web server 104 may configure the webpage to provide the at least one user action based on the configuration data.

Continuing with FIG. 12B, in response to the scanning of a code, a request to access the webpage is received in step 1256. For example, scanning device 112 may scan code 302. In response, a web browser of scanning device 302 may be directed to the webpage hosted by web server 104. At step 1258, access to the webpage is provided. For example, web server 104 may allow scanning device 112 to access webpage 405. At step 1260, a request to initiate the at least one user action is received. For example, a user of scanning device 112 may engage one of the plurality of icons 420 on webpage 405. Upon engagement, scanning device 112 may transmit to web server 104 data identifying engagement of the icon, causing web browser 104 to initiate the corresponding user action. At step 1262, the at least one user action is initiated in response to the request. The method then ends.

Figure 12C:
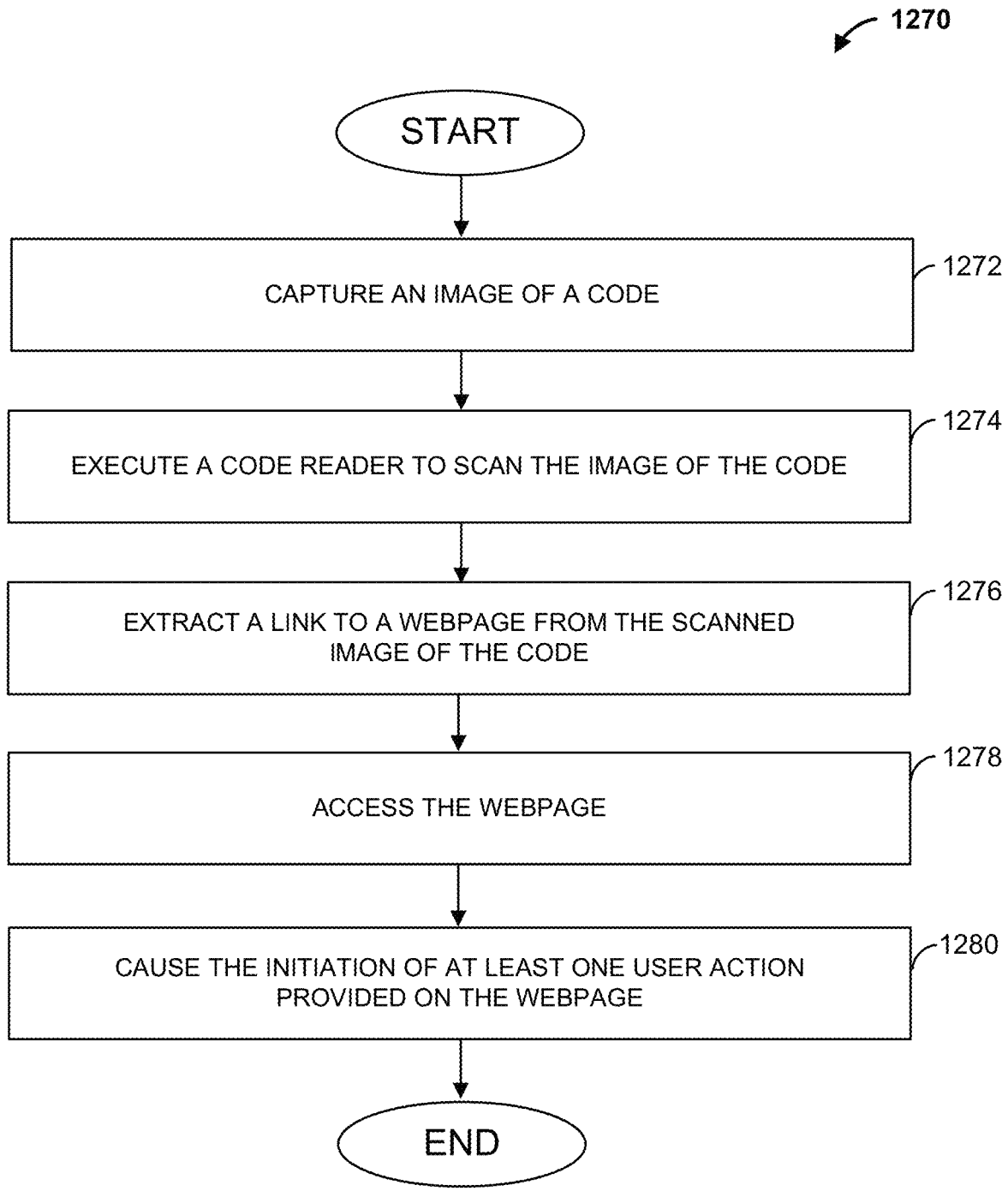

FIG. 12C illustrates a flowchart of an example method 1270 that may be carried out by, for example, the scanning device 112 of FIG. 1. Beginning at step 1272, an image of a code is captured. For example, scanning device 112 may capture an image of code 302 from platform 130 (e.g., using a camera). At step 1274, a code reader is executed to scan the image of the code. For example, scanning device 112 may execute a code reader to scan the code from the captured image. At step 1276, a link to a webpage is extracted from the scanned image of the code. For example, based on executing the code reader, scanning device 112 may extract a link to a webpage from the scanned image. At step 1278, the webpage is accessed. For example, scanning device 112 may direct a web browser to access the web site associated with the extracted link. At step 1280, operations are executed to cause the initiation of at least one user action provided on the webpage. For example, a user of scanning device 112 may engage one of the plurality of icons 420 provided by webpage 405, thereby causing the initiation of an associated action. The method then ends.

Figure 13:
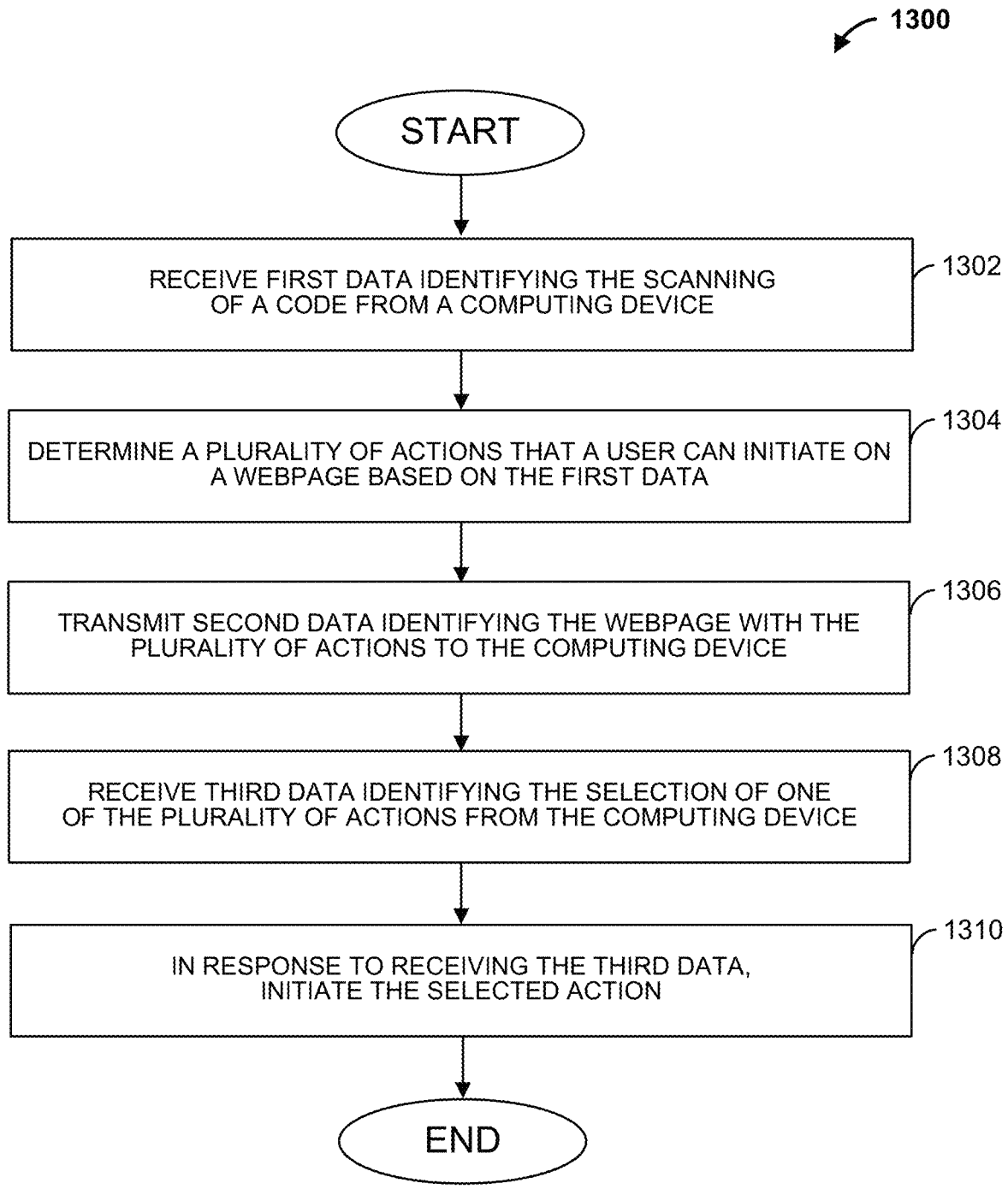
FIG. 13 illustrates another example method that may be performed by the code scanning system of FIG. 1 in accordance with some embodiments.

FIG. 13 illustrates a flowchart of another example method 1300 that may be carried out by, for example, the web server 104 of FIG. 1. Beginning at step 1302, first data is received from a computing device. The first data identifies the scanning of a code by the computing device. At step 1304, based on the first data, a plurality of actions that a user can initiate on a webpage are determined.

Proceeding to step 1306, second data is transmitted to the computing device. The second data identifies the webpage with the plurality of actions that the user can initiate. At step 1308, third data is received from the computing device. The third data identifies a selection of one of the plurality of actions provided on the webpage. At step 1310, in response to receiving the third data, the selected action is initiated.

Although the methods described above are with reference to the illustrated flowcharts, it will be appreciated that many other ways of performing the acts associated with the methods can be used. For example, the order of some operations may be changed, and some of the operations described may be optional.

In addition, the methods and systems described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A method by a first computing device comprising:
    receiving an input identifying at least one scanning action of a plurality of scanning actions;
    generating code scanning action data that associates at least one scanning action to a code;
    receiving first data identifying a scanning, by a second computing device, of the code;
    in response to receiving the first data, determining the at least one scanning action corresponding to the code based on the code scanning action data;
    executing the at least one scanning action; and
    transmitting second data to the second computing device identifying the initiation of the at least one scanning action.

2. The method of claim 1, wherein the at least one scanning action comprises directing the second computing device to a webpage.

3. The method of claim 1, comprising providing the code on a webpage, wherein the scanning of the code by the second computing device comprises scanning the code on the webpage.

4. The method of claim 1, comprising
    in response to the received input, generating the code.

5. The method of claim 1, comprising:
    receiving third data identifying at least one user action to be provided on a webpage; and
    providing the at least one user action on the webpage.

6. The method of claim 5, wherein the at least one user action comprises at least one of ordering a sample of material, saving the webpage to a user's account, and requesting information for a material.

7. The method of claim 1, further comprising transmitting the code to a third computing device for display.

8. The method of claim 1, wherein the code is a quick response (QR) code.

9. A computing device comprising at least one processor configured to:
    receive an input identifying at least one scanning action of a plurality of scanning actions;
    generate code scanning action data that associates the at least one scanning action to a code;
    receive first data identifying a scanning, by a second computing device, of a code;
    in response to receiving the first data, determine at least one scanning action corresponding to the code based on the code scanning action data;
    execute the at least one scanning action; and
    transmit second data to the second computing device identifying the initiation of the at least one scanning action.

10. The computing device of claim 9, wherein the at least one scanning action comprises directing the second computing device to a webpage.

11. The computing device of claim 9, wherein the at least one processor is configured to provide the code on a webpage, wherein the scanning of the code by the second computing device comprises scanning the code on the webpage.

12. The computing device of claim 9, wherein the at least one processor is configured to
    in response to the received input, generate the code based on the third data.

13. The computing device of claim 9, wherein the at least one processor is configured to:
    receive third data identifying at least one user action to be provided on a webpage; and
    provide the at least one user action on the webpage.

14. The computing device of claim 13, wherein the at least one user action comprises at least one of ordering a sample of material, saving the webpage to a user's account, and requesting information for a material.

15. The computing device of claim 9, wherein the at least one processor is configured to transmit the code to a third computing device for display.

16. The computing device of claim 9, wherein the code is a quick response (QR) code.

17. A computing device comprising at least one processor configured to:
    receive first data identifying at least one user action;
    configure a webpage to provide the at least one user action;
    generate a code that, in response to scanning the code by a second computing device, causes the second computing device to be directed to the webpage;
    generate code scanning action data that associates the at least one user action to the code;
    provide the code for display;
    receive second data identifying a scanning of the code;
    in response to receiving the second data, determine the at least one user action corresponding to the code based on the code scanning action; and
    execute the at least one user action.

18. The computing device of claim 17 wherein the at least one processor is configured to:
    receive a request from the second computing device to access the webpage in response to the scanning of the code;
    provide access to the webpage to the second computing device.

19. The computing device of claim 18 wherein the at least one processor is configured to:
    receive, from the second computing device, a request to initiate the at least one user action; and
    initiate the at least one user action in response to the received request.

20. The computing device of claim 19, wherein the at least one user action comprises transmitting a request to be contacted.

* * * * *